(12) United States Patent
Padiyath et al.

(10) Patent No.: US 7,652,736 B2
(45) Date of Patent: Jan. 26, 2010

(54) INFRARED LIGHT REFLECTING FILM

(75) Inventors: Raghunath Padiyath, Woodbury, MN (US); Marc D. Radcliffe, Newport, MN (US); Cristina U. Thomas, Stillwater, MN (US); Charles A. Marttila, Shoreview, MN (US); Manish Jain, Minneapolis, MN (US); Michael F. Weber, Shoreview, MN (US); Feng Bai, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 541 days.

(21) Appl. No.: 11/257,965

(22) Filed: Oct. 25, 2005

(65) Prior Publication Data

US 2007/0109673 A1 May 17, 2007

(51) Int. Cl.
*G02F 1/1335* (2006.01)
(52) U.S. Cl. .................... 349/115; 349/175; 349/176
(58) Field of Classification Search ................ 349/115, 349/175
See application file for complete search history.

(56) References Cited

U.S. PATENT DOCUMENTS

| | | | |
|---|---|---|---|
| 3,610,724 A | 10/1971 | Frizzell | |
| 3,711,176 A | 1/1973 | Alfrey, Jr. et al. | |
| 4,293,435 A | 10/1981 | Portugall et al. | |
| 4,446,305 A | 5/1984 | Rogers et al. | |
| 4,540,623 A | 9/1985 | Im et al. | |
| 4,974,941 A | 12/1990 | Gibbons et al. | |
| 5,032,009 A | 7/1991 | Gibbons et al. | |
| 5,332,522 A | 7/1994 | Chen et al. | |
| 5,360,659 A * | 11/1994 | Arends et al. ............ | 428/216 |
| 5,389,698 A | 2/1995 | Chigrinov et al. | |
| 5,448,404 A | 9/1995 | Schrenk et al. | |
| 5,602,661 A | 2/1997 | Schadt et al. | |
| 5,744,057 A | 4/1998 | Meyer et al. | |
| 5,780,629 A | 7/1998 | Etzbach et al. | |
| 5,838,407 A | 11/1998 | Chigrinov et al. | |
| 5,847,068 A | 12/1998 | Maxein et al. | |
| 5,882,774 A | 3/1999 | Jonza et al. | |
| 5,886,242 A | 3/1999 | Etzbach et al. | |
| 6,001,277 A | 12/1999 | Ichimura et al. | |
| 6,034,813 A | 3/2000 | Woodard et al. | |
| 6,045,894 A | 4/2000 | Jonza et al. | |
| 6,049,419 A * | 4/2000 | Wheatley et al. ............ | 359/359 |
| 6,207,260 B1 | 3/2001 | Wheatley et al. | |
| 6,352,761 B1 | 3/2002 | Hebrink et al. | |
| 6,368,699 B1 | 4/2002 | Gilbert et al. | |
| 6,395,354 B1 | 5/2002 | Sahouani et al. | |
| 6,531,230 B1 | 3/2003 | Weber et al. | |
| 6,565,982 B1 | 5/2003 | Ouderkirk et al. | |
| 6,574,045 B2 | 6/2003 | Hebrink et al. | |

(Continued)

FOREIGN PATENT DOCUMENTS

EP 1350618 10/2003

(Continued)

*Primary Examiner*—David Nelms
*Assistant Examiner*—Thanh-Nhan P Nguyen
(74) *Attorney, Agent, or Firm*—Jeffrey M. Olofson (57) ABSTRACT

An infrared light reflecting article is disclosed and includes a visible light transparent substrate including a polymer and an infrared light reflecting cholesteric liquid crystal layer disposed on the substrate. The substrate and infrared light reflecting cholesteric liquid crystal layer have a combined haze value of less than 3%.

22 Claims, 1 Drawing Sheet

U.S. PATENT DOCUMENTS

| | | |
|---|---|---|
| 6,663,950 B2 | 12/2003 | Barth et al. |
| 6,667,095 B2 | 12/2003 | Wheatley et al. |
| 6,737,154 B2 | 5/2004 | Jonza et al. |
| 6,811,867 B1 | 11/2004 | McGurran et al. |
| 7,123,335 B2 * | 10/2006 | Chari et al. ............... 349/169 |
| 7,132,064 B2 * | 11/2006 | Li et al. ............... 264/1.36 |
| 2001/0022982 A1 | 9/2001 | Neavin et al. |
| 2002/0021392 A1 * | 2/2002 | Ohtake et al. ............... 349/115 |
| 2004/0004778 A1 * | 1/2004 | Liu et al. ............... 359/883 |
| 2004/0032658 A1 * | 2/2004 | Fleming ............... 359/498 |
| 2004/0033675 A1 | 2/2004 | Fleming et al. |
| 2004/0043180 A1 | 3/2004 | Jiang et al. |
| 2004/0165140 A1 | 8/2004 | Pokorny et al. |
| 2005/0264725 A1 * | 12/2005 | Chari et al. ............... 349/113 |
| 2005/0266158 A1 * | 12/2005 | Pokorny et al. ............... 427/162 |
| 2006/0077325 A1 * | 4/2006 | Li et al. ............... 349/115 |

FOREIGN PATENT DOCUMENTS

| | | |
|---|---|---|
| EP | 0834754 | 12/2004 |
| JP | 64061238 | 3/1989 |
| JP | 10054909 | 2/1998 |
| JP | 13330731 | 11/2001 |
| WO | 9939224 | 8/1999 |
| WO | 2004000549 | 12/2003 |

* cited by examiner

INFRARED LIGHT REFLECTING FILM

BACKGROUND

The present disclosure relates generally to infrared light reflecting film. The present invention more particularly relates to infrared light reflecting film that includes a cholesteric liquid crystal layer.

Dyed and vacuum-coated plastic films have been applied to windows to reduce heat load due to sunlight. To reduce heat load, solar transmission is blocked in either the visible or the infrared portions of the solar spectrum (i.e., at wavelengths ranging from 400 nm to 2500 nm or greater.)

Primarily through absorption, dyed films can control the transmission of visible light and consequently provides glare reduction. However, dyed films generally do not block near-infrared solar energy and consequently are not completely effective as infrared light reflecting film or solar control films. Dyed films also often fade with solar exposure. In addition, when films are colored with multiple dyes, the dyes often fade at different rates, causing an unwanted color changes over the life of the film.

Other known window films are fabricated using vacuum-deposited grey metals, such as stainless steel, inconel, monel, chrome, or nichrome alloys. The deposited grey metal films offer about the same degrees of transmission in the visible and infrared portions of the solar spectrum. As a result, the grey metal films are an improvement over dyed films with regard to solar control. The grey metal films are relatively stable when exposed to light, oxygen, and/or moisture, and in those cases in which the transmission of the coatings increases due to oxidation, color changes are generally not detectable. After application to clear glass, grey metals block light transmission by approximately equal amounts of solar reflection and absorption.

Vacuum-deposited layers such as silver, aluminum, and copper control solar radiation primarily by reflection and are useful only in a limited number of applications due to the high level of visible reflectance. A modest degree of selectivity (i.e., higher visible transmission than infrared transmission) is afforded by certain reflective materials, such as copper and silver.

There is a need for improved infrared light reflecting film or solar control film that has a high visible light transmission and substantially blocks infrared radiation.

SUMMARY

The present disclosure relates generally to infrared light reflecting film. The present invention more particularly relates to infrared light reflecting film that includes a cholesteric liquid crystal layer.

In one embodiment an infrared light reflecting article is disclosed and includes a visible light transparent substrate including a polymer and an infrared light reflecting cholesteric liquid crystal layer disposed on the substrate. The substrate and infrared light reflecting cholesteric liquid crystal layer have a combined haze value of less than 3%.

In another embodiment a light control article for blocking infrared light from an infrared light source includes a visible light transparent substrate including a polymer, an infrared light reflecting cholesteric liquid crystal layer disposed on the substrate, a pressure sensitive adhesive layer disposed on the visible light transparent substrate or the infrared light reflecting cholesteric liquid crystal layer, and a glass substrate disposed on the pressure sensitive adhesive layer.

Yet other embodiments include an infrared light reflecting article including a first cholesteric liquid crystal layer that reflects light in a first range of infrared wavelengths, a second cholesteric liquid crystal layer that reflects light in the first range of infrared wavelengths, and a retarder film disposed between the first cholesteric liquid crystal layer and the second cholesteric liquid crystal layer. The retarder film retards at least a portion of the light in the first range of infrared wavelengths such that the light is reflected by the second cholesteric liquid crystal layer.

BRIEF DESCRIPTION OF THE DRAWINGS

The present application may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, % wt, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to a composition containing "a layer" encompasses embodiments having one, two or more layers. As used in this specification and the appended claims, the term "or" is generally employed in its sense including "and/or" unless the content clearly dictates otherwise.

The term "pressure-sensitive adhesive" or "PSA" refers to a viscoelastic material that possesses the following properties: (1) aggressive and permanent tack, (2) adherence with no more than finger pressure, (3) sufficient ability to hold onto a substrate, and (4) sufficient cohesive strength to be removed cleanly from the substrate.

The term "polymer" will be understood to include polymers, copolymers (e.g., polymers formed using two or more different monomers), oligomers and combinations thereof, as well as polymers, oligomers, or copolymers. Both block and random copolymers are included, unless indicated otherwise.

The term "adjacent" refers to one element being in close proximity to another element and includes the elements touching one another and further includes the elements being separated by one or more layers disposed between the elements.

The term "layer" will be understood to include a single physical thickness or a single optical thickness. A single physical thickness can include a distinct boundary layer or can include a non-distinct boundary layer such as, for example, a compositional gradient between layers. A single optical thickness can be observed by an optical property such as, for example, reflection of light about a range of wavelengths. It is understood that zones between layers can include one or more or gradients of material or optical property gradients The term "polymeric material" will be understood to include polymers, as defined above, and other organic or inorganic additives, such as, for example, antioxidants, stabilizers, antiozonants, plasticizers, dyes, and pigments.

The term "cholesteric liquid crystal composition" refers to a composition including, but not limited to, a cholesteric liquid crystal compound, a cholesteric liquid crystal polymer or a cholesteric liquid crystal precursor such as, for example, lower molecular weight cholesteric liquid crystal compounds including monomers and oligomers that can be reacted to form a cholesteric liquid crystal polymer.

The term a "mixture" refers to an association of heterogeneous substances that may or may not be uniformly dispersed including, for example, a solution, dispersion and the like.

The term a "chiral" unit refers to an asymmetrical unit that does not posses a mirror plane. A chiral unit is capable of rotating a plane of polarization of light to either the left or the right in a circular direction.

The term a "mesogenic" unit refers to a unit having a geometrical structure that facilitates the formation of a liquid crystal mesophase.

The term a "nematic" liquid crystal compound refers to a liquid crystal compound that forms a nematic liquid crystal phase.

The term "solvent" refers to a substance that is capable of at least partially dissolving another substance (solute) to form a solution or dispersion. A "solvent" may be a mixture of one or more substances.

The term "chiral material" refers to chiral compounds or compositions, including chiral liquid crystal compounds and chiral non-liquid crystal compounds that can form or induce a cholesteric liquid crystal mesophase in combination with other liquid crystal material.

The term "polarization" refers to plane polarization, circular polarization, elliptical polarization, or any other nonrandom polarization state in which the electric vector of the beam of light does not change direction randomly, but either maintains a constant orientation or varies in a systematic manner. In plane polarization, the electric vector remains in a single plane, while in circular or elliptical polarization, the electric vector of the beam of light rotates in a systematic manner.

Reflective polarizers preferentially reflect light of one polarization and preferentially transmit the remaining light. In the case of circular reflective polarizers, light circularly polarized in one sense, which may be the clockwise or counterclockwise sense (also referred to as right or left circular polarization), is preferentially transmitted and light polarized in the opposite sense is preferentially reflected. One type of circular polarizer includes cholesteric liquid crystal polarizers.

The present disclosure relates generally to infrared light (IR) reflecting film articles. The present invention more particularly relates to infrared light reflecting film articles that includes a cholesteric liquid crystal layer. The infrared light reflecting film described below is believed to be applicable to a variety of applications needing IR reflection, for example, architectural and transportation applications. The infrared light reflecting article includes an IR reflecting cholesteric liquid crystal layer disposed on a transparent substrate. In other embodiments, the infrared light reflecting article includes an IR reflecting cholesteric liquid crystal layer disposed between a transparent substrate and an adhesive layer. The infrared light reflecting article can be adhered to an optical substrate such as, for example, a glass substrate. These examples, and the examples discussed below, provide an appreciation of the applicability of the disclosed infrared light reflecting article, but should not be interpreted in a limiting sense.

Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include a chiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360°. In many embodiments, this distance is 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For light propagating along the helical axis, Bragg reflection generally occurs when the wavelength, λ, is in the following range $$n_o p < \lambda < n_e p$$

where p is the pitch and $n_o$ and $n_e$ are the principal refractive indices of the cholesteric liquid crystal material. For example, the pitch can be selected such that the Bragg reflection is peaked in the visible, ultraviolet, or infrared wavelength regimes of light. In many embodiments, the pitch is selected such that the Bragg reflection is peaked in at least the infrared wavelength regime of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435 and 5,332,522, 5,886,242, 5,847,068, 5,780,629, 5,744,057 all of which are incorporated herein by reference.

In many embodiments, the cholesteric liquid crystal compound includes a compound of formula (I):

where, n is 1, 2, 3, or 4; R is an acrylate, methacrylate, or acrylamide; $R_1$ is a ($C_1$-$C_8$) alkylene, ($C_2$-$C_8$) alkenylene, or ($C_2$-$C_8$) alkylyne; $R_2$ is a bond, —O—, —C(O)O—, —O(O)C—, —OC(O)O—, —C(O)N—, —CH=N—, —N=CH—, or —NC(O)—; $R_3$ is a cycloalkylene, cycloalkenylene, heterocyclylene, arylene, or hetroarylene; $R_4$ is a bond, ($C_1$-$C_8$) alkylene, ($C_2$-$C_8$) alkenylene, ($C_2$-$C_8$) alkylyne, carbonyl, —O—, —C(O)O—, —O(O)C—, —OC(O)O—, —C(O)N—, —CH=N—, —N=CH—, or —NC(O)—; $R_3$ and $R_4$ are independently selected for each n; $R_5$ is a bond, cycloalkylene, cycloalkenylene, hetrocyclylene, arylene, or hetroarylene; $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$.

In some embodiments, the cholesteric liquid crystal compound includes a compound of formula (I):

where, n is 1 or 2; R is an acrylate or methacrylate, $R_1$ is a ($C_1$-$C_6$) alkylene; $R_2$ is a bond or —O—; $R_3$ is an arylene or hetroarylene; $R_4$ is a bond, ($C_1$-$C_8$) alkylene, —O—, —C(O)O—, —O(O)C—, —OC(O)O—, —C(O)N—; $R_3$ and $R_4$ are independently selected for each n; $R_5$ is a bond, arylene, or hetroarylene; and $R_6$ is hydrogen, cyano, halo, ($C_1$-$C_8$) alkoxy, ($C_1$-$C_8$) alkyl, nitro, amino, carboxy, ($C_1$-$C_4$)thioalkyl, $COCH_3$, $CF_3$, $OCF_3$, or $SCF_3$.

One example of a cholesteric liquid crystal acrylate is a compound of formula C2:

Formula C2 can be prepared as described in EP 834754. An example of commercially available achiral molecular unit is Paliocolor LC242, available from BASF, Charlotte, N.C. An example of commercially available chiral molecular unit is Paliocolor LC756, available from BASF, Charlotte, N.C. However, other cholesteric liquid crystal compounds and precursors not disclosed therein can also be utilized in compositions of the invention.

Other cholesteric liquid crystal compounds can also be used. A cholesteric liquid crystal compound may be selected for a particular application or optical body based on one or more factors including, for example, refractive indices, surface energy, pitch, process-ability, clarity, color, low absorption in the wavelength of interest, compatibility with other components (e.g., a nematic liquid crystal compound), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are generally formed using chiral (or a mixture of chiral and achiral) molecules (including monomers) that can include a mesogenic group (e.g., a rigid group that typically has a rod-like structure to facilitate formation of a liquid crystal phase). Mesogenic groups include, for example, para-substituted cyclic groups (e.g., para-substituted benzene rings). The mesogenic groups are optionally bonded to a polymer backbone through a spacer. The spacer can contain functional groups having, for example, benzene, pyridine, pyrimidine, alkyne, ester, alkylene, alkene, ether, thioether, thioester, and amide functionalities. The length or type of spacer can be altered to provide different properties such as, for example, solubilities in solvent(s).

Suitable cholesteric liquid crystal polymers include polymers having a chiral or achiral polyester, polycarbonate, polyamide, polyacrylate, polymethacrylate, polysiloxane, or polyesterimide backbone that include mesogenic groups optionally separated by rigid or flexible co-monomers. Other suitable cholesteric liquid crystal polymers have a polymer backbone (for example, a polyacrylate, polymethacrylate, polysiloxane, polyolefin, or polymalonate backbone) with chiral and achiral mesogenic side-chain groups. The side-chain groups are optionally separated from the backbone by a spacer, such as, for example, an alkylene or alkylene oxide spacer, to provide flexibility.

To form a cholesteric liquid crystal layer, a cholesteric liquid crystal composition can be coated or otherwise disposed onto a surface. The cholesteric liquid crystal composition includes a chiral component containing at least one (i) chiral compound, (ii) chiral monomer that can be used (e.g., polymerized or crosslinked) to form a cholesteric liquid crystal polymer, or (iii) a combination thereof. The cholesteric liquid crystal composition can also include a non-chiral component that contains at least one (i) nematic liquid crystal compound, (ii) nematic liquid crystal monomer that can be used to form a nematic liquid crystal polymer, or (iii) a combination thereof. Together with the chiral component, the nematic liquid crystal compound(s) or nematic liquid crystal monomers can be used to modify the pitch of the cholesteric liquid crystal composition. The cholesteric liquid crystal composition can also include one or more additives, such as, for example, curing agents, crosslinkers, antiozonants, antioxidants, plasticizers, stabilizers, and ultraviolet, infrared, or visible light-absorbing dyes and pigments.

Cholesteric liquid crystal compositions can also be formed using one, two, three, or more different types of any of the following: chiral compounds, achiral compounds, cholesteric liquid crystals, cholesteric liquid crystal monomers, nematic liquid crystals, nematic liquid crystal monomers, latent nematic or chiral nematic materials (in which the latent material exhibits the liquid crystal mesophase in combination with other materials), or combinations thereof. The particular ratio(s) by weight of materials in the cholesteric liquid crystal composition will generally determine, at least in part, the pitch of the cholesteric liquid crystal layer.

The cholesteric liquid crystal composition is generally part of a coating composition that may include a solvent(s). In some instances, one or more of the liquid crystals, liquid crystal monomers, processing additives, or any other component of the cholesteric liquid crystal composition may also act as a solvent. In some cases, the solvent can be substantially removed or eliminated from the coating composition by, for example, drying the composition to evaporate the solvent or reacting a portion of the solvent (e.g., reacting a solvating liquid crystal monomer to form a liquid crystal polymer) or by cooling below the processing temperature of the composition.

Reacting a thiol compound with the liquid crystal compound has been found to reduce the haze value of resulting cholesteric liquid crystal films. In some embodiments, the thiol compound is protected by a protecting group until the compound is co-polymerized into the cholesteric liquid crystal compound (see example 1 RAFT agent). In many embodiments, the thiol compound is an alkyl thiol. While not intending to be bound by any particular theory, aliphatic chain end may act as molecular lubricants, thus, facilitating alignment of the liquid crystal molecules/segments during a thermal induced phase separation process, since aliphatic segments have lower melting temperatures. Thus, the thiol compound can aid in reducing a haze measured haze value in the liquid crystal films (single layer, bi-layer, or tri-layer structures) described herein.

The thiol compound can assist in lowering a haze value of the resulting cholesteric liquid crystal layer. In some embodiments, the cholesteric liquid crystal layer has a haze value in a range from 0 to 5% (less than 5%), or from 0 to 4% (less than 4%), or from 0 to 3% (less than 3%), or from 0 to 2% (less than 2%), or from 0 to 1% (less than 1%). In other embodiments, the cholesteric liquid crystal layer disposed on a substrate has a total (or combined) haze value in a range from 0 to 5% (less than 5%), or from 0 to 4% (less than 4%), or from 0 to 3% (less than 3%), or from 0 to 2% (less than 2%), or from 0 to 1% (less than 1%).

The "haze" value of an optical body can be determined from the percentage of light which, in passing through the body, deviates from the incident beam through forward scatter by more than a specified average degree. ASTM D1003 provides a method for making such a measurement.

The thiol compound includes one or more pendent thiol moieties attached to an organic moiety. The organic moiety may include a linear, branched or cyclic hydrocarbon structure that may contain one or more heteroatomic substitutions that do not interfere with the specified function of the composition. Substituents include alkoxy, hydroxy, amino, alkyl substituted amino, or halo, for example.

In some embodiments the thiol compound is a linear or branched ($C_1$-$C_{18}$) alkyl thiol, or a linear or branched ($C_6$-$C_{12}$) alkyl thiol. In some embodiments, the thiol compound is $CH_3(CH_2)_5SH$, $CH_3(CH_2)_6SH$, $CH_3(CH_2)_7SH$, $CH_3(CH_2)_8SH$, $CH_3(CH_2)_9SH$, $CH_3(CH_2)_{10}SH$, $CH_3(CH_2)_1 SH$, or $HO(CH_2)_{11}SH$.

In many embodiments, cholesteric liquid crystal polymers are formed by reacting cholesteric liquid crystal compositions with from about 0.1 to 35 %, 1 to 20 %, or 1 to 10 % of one or more thiol compounds by weight of the total solids content of the polymer.

After coating, the cholesteric liquid crystal composition is converted into a liquid crystal layer or material. This conversion can be accomplished by a variety of techniques including evaporation of a solvent; heating; crosslinking the cholesteric liquid crystal composition; or curing (e.g., polymerizing) the cholesteric liquid crystal composition using, for example, heat, radiation (e.g., actinic radiation), light (e.g., ultraviolet, visible, or infrared light), an electron beam, or a combination of these or like techniques.

As a result of the coating and conversion to cholesteric liquid crystal materials, a cholesteric reflective polarizer that is effective over a wide range of wavelengths can be produced, if desired. In some embodiments, the cholesteric reflective polarizer substantially reflects light over a spectral width of at least 100, 150, 200, 300, 400, 500 or 600 nm or more measured as full width at half peak height of the reflection spectrum.

Optionally, initiators can be included within the cholesteric liquid crystal composition to initiate polymerization or crosslinking of monomeric components of the composition. Examples of suitable initiators include those that can generate free radicals to initiate and propagate polymerization or crosslinking. Free radical generators can also be chosen according to stability or half-life. Preferably the free radical initiator does not generate any additional color in the cholesteric liquid crystal layer by absorption or other means. Examples of suitable free radical initiators include thermal free radical initiators and photoinitiators. Thermal free radical initiators include, for example peroxides, persulfates, or azonitrile compounds. These free radical initiators generate free radicals upon thermal decomposition.

Photoinitiators can be activated by electromagnetic radiation or particle irradiation. Examples of suitable photoinitiators include, onium salt photoinitiators, organometallic photoinitiators, metal salt cationic photoinitiators, photodecomposable organosilanes, latent sulphonic acids, phosphine oxides, cyclohexyl phenyl ketones, amine substituted acetophenones, and benzophenones. Generally, ultraviolet (UV) irradiation is used to activate the photoinitiator, although other light sources can be used. Photoinitiators can be chosen based on the absorption of particular wavelengths of light.

An aligned cholesteric liquid crystal phase can be achieved using conventional treatments. For example, a method of developing a cholesteric liquid crystal phase includes depositing the cholesteric liquid crystal composition on an oriented substrate. The substrate can be oriented using, for example, drawing techniques or rubbing with rayon or other cloth. Photoalignment orientated substrates are described in U.S. Pat. Nos. 4,974,941, 5,032,009, 5,389,698, 5,602,661, 5,838,407, and 5,958,293. After deposition, the cholesteric liquid crystal composition is heated above the glass transition temperature of the composition to the liquid crystal phase. The composition can be cooled into a glassy state and the composition remains in the liquid crystal phase. Alternatively or in addition, the composition can be photoset while in the liquid crystal phase.

Optical bodies can be formed by disposing at least one cholesteric liquid crystal material on a substrate. The surface of the substrate (e.g., the surface of an alignment layer provided as part of the substrate) has a surface alignment feature that can improve or provide uniformity of alignment of the cholesteric liquid crystal material disposed thereon. A surface alignment includes any surface features that produce alignment of the director of the liquid crystal material at that surface. Surface alignment features can be produced by a variety of different methods including, for example, unidirectional rubbing of the substrate, stretching the substrate, or photoalignment of a photopolymerizable material by light, among others.

The substrate can provide a base for deposition or formation of an optical body or structure including the various cholesteric liquid crystal compounds. The substrate can be a structural support member during manufacture, use, or both. The substrate may be transparent over the wavelength range of operation of the optical body such as, for example, the visible light spectrum (from 425nm to 750nm). In some embodiments, the substrate is a retarder or retardation film such as, for example, a half wave plate. In some embodiments, substrates include polyesters, such as polyethylene terphathalate (PET) or polyvinyl alcohols. In some embodiments, the substrate is non-birefringent.

The substrate can have more than one layer. In some embodiments, the substrate is a multi-layer optical film (MOF). The layers can have different refractive index characteristics so that some light is reflected at interfaces between adjacent layers. The layers are sufficiently thin so that light reflected at a plurality of the interfaces undergoes constructive or destructive interference in order to give the film the desired reflective or transmissive properties. For optical films designed to reflect light at ultraviolet, visible, or near-infrared wavelengths, each layer generally has an optical thickness (i.e., a physical thickness multiplied by refractive index) of less than about 1 micrometer. Thicker layers can, however, also be included, such as skin layers at the outer surfaces of the film, or protective boundary layers disposed within the film that separate packets of layers.

The reflective and transmissive properties of multilayer optical film are a function of the refractive indices of the respective layers. Each layer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. In practice, the refractive indices are controlled by judicious materials selection and processing conditions. MOF film can be made by co-extrusion of typically tens or hundreds of layers of two alternating polymers A, B, followed by optionally passing the multilayer extrudate through one or more multiplication dies, and then stretching or otherwise orienting the extrudate to form a final film. The resulting film is composed of typically tens or hundreds of individual layers whose thicknesses and refractive indices are tailored to provide one or more reflection bands in desired region(s) of the spectrum, such as in the visible or near infrared. In order to achieve high reflectivities with a reasonable number of layers, adjacent layers preferably exhibit a difference in refractive index ($\Delta n_x$) for light polarized along the x-axis of at least 0.05. In some embodiments, if the high reflectivity is desired for two orthogonal polarizations, then the adjacent layers also exhibit a difference in refractive index ($\Delta n_y$) for light polarized along the y-axis of at least 0.05. In other embodiments, the refractive index difference $\Delta n_y$ can be less than 0.05 or 0 to produce a multilayer stack that reflects normally incident light of one polarization state and transmits normally incident light of an orthogonal polarization state.

If desired, the refractive index difference ($\Delta n_z$) between adjacent layers for light polarized along the z-axis can also be tailored to achieve desirable reflectivity properties for the p-polarization component of obliquely incident light. For ease of explanation, at any point of interest on a multilayer optical film the x-axis will be considered to be oriented within the plane of the film such that the magnitude of $\Delta n_x$ is a maximum. Hence, the magnitude of $\Delta n_y$ can be equal to or less than (but not greater than) the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where $j=x$, y, or z and where the layer designations 1, 2 are chosen so that $n_{1x} \geq n_{2x}$, i.e., $\Delta n_x \geq 0$.

To maintain high reflectivity of p-polarized light at oblique angles of incidence, the z-index mismatch $\Delta n_z$ between layers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between layers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Multilayer optical films have been described in, for example, U.S. Pat. No. 3,610,724 (Rogers); U.S. Pat. No. 3,711,176 (Alfrey, Jr. et al.), "Highly Reflective Thermoplastic Optical Bodies For Infrared, Visible or Ultraviolet Light"; U.S. Pat. No. 4,446,305 (Rogers et al.); U.S. Pat. No. 4,540,623 (Im et al.); U.S. Pat. No. 5,448,404 (Schrenk et al.); U.S. Pat. No. 5,882,774 (Jonza et al.) "Optical Film"; U.S. Pat. No. 6,045,894 (Jonza et al.) "Clear to Colored Security Film"; U.S. Pat. No. 6,531,230 (Weber et al.) "Color Shifting Film"; PCT Publication WO 99/39224 (Ouderkirk et al.) "Infrared Interference Filter"; and US Patent Publication 2001/0022982 A1 (Neavin et al.), "Apparatus For Making Multilayer Optical Films", all of which are incorporated herein by reference. In such polymeric multilayer optical films, polymer materials are used predominantly or exclusively in the makeup of the individual layers. Such films can be compatible with high volume manufacturing processes, and may be made in large sheets and roll goods.

The multilayer film can be formed by any useful combination of alternating polymer type layers. In one embodiment, the multilayer optical film is formed by alternating layers of a first polymer type including polyethylene terephthalate (PET) or copolymer of polyethylene terephthalate (coPET) and a second polymer type including poly(methyl methacrylate) (PMMA) or a copolymer of poly(methyl methacrylate) (coPMMA). In one embodiment, the multilayer optical film is formed by alternating layers of a first polymer type including polyethylene terephthalate and a second polymer type including a copolymer of poly(methyl methacrylate and ethyl acrylate). In another embodiment, the multilayer optical film is formed by alternating layers of a first polymer type including cyclohexanedimethanol (PETG) or a copolymer of cyclohexanedimethanol (coPETG) and second polymer type including polyethylene naphthalate (PEN) or a copolymer of polyethylene naphthalate (coPEN). In another embodiment, the multilayer optical film is formed by alternating layers of a first polymer type including polyethylene naphthalate or a copolymer of polyethylene naphthalate and a second polymer type including poly(methyl methacrylate) or a copolymer of poly (methyl methacrylate). Useful combination of alternating polymer type layers are disclosed in U.S. Pat. No. 6,352,761, which is incorporated by reference herein.

In one embodiment, the substrate contains an alignment layer having a surface capable of orienting a liquid crystal composition disposed on the alignment layer in a fairly uniform direction. Alignment layers can be made using mechanical or chemical methods. Mechanical methods of making an alignment layer include, for example, rubbing or stretching a polymer layer in the desired alignment direction. For example, polyvinyl alcohol, polyamide, and polyimide films can be aligned by rubbing the film in the desired alignment direction. Films that can be aligned by stretching include, for example, polyvinyl alcohol, polyolefins such as, for example, polyethylene or polypropylene, polyesters such as, for example, polyethylene terphthalate or polyethylene naphthalate, and polystyrene. The polymer film can be a homopolymer, a copolymer, or a mixture of polymers.

An alignment layer can be formed photochemically. For example, photo-orientable polymers can be formed into alignment layers by irradiation, or by using anisotropically absorbing molecules disposed in a medium or on a substrate with light (e.g., ultraviolet light) that is linearly polarized relative to the desired alignment direction, as described in U.S. Pat. Nos. 4,974,941, 5,032,009, and 5,958,293, all of which are incorporated herein by reference. Suitable photo-orientable polymers include polyimides including, for example, substituted 1,4-benzenediamines.

Another class of photoalignment materials can be used to form alignment layers. These polymers selectively react in the presence of polarized ultraviolet light along or perpendicular to the direction of the electric field vector of the polarized ultraviolet light, which once reacted, have been shown to align liquid crystal compositions or materials. Examples of these materials are described, for example, in U.S. Pat. Nos. 5,389,698, 5,602,661, and 5,838,407, all of which are incorporated herein by reference.

Photoisomerizable compounds such as, for example, azobenzene derivatives are also suitable for photoalignment, as described in U.S. Pat. No. 6,001,277, incorporated herein by reference. Alignment layers can also be formed by coating certain types of lyotropic molecules which orient due to shear applied during coating. Molecules of this type are disclosed, for example, in U.S. Pat. No. 6,395,354, herein incorporated by reference.

The optical bodies can be combined with other optical or physical elements. In one, embodiment, a visible light transparent polymeric film can be disposed between an infrared light reflecting cholesteric liquid crystal layer and a pressure sensitive adhesive layer. This construction can be adhered to an optical body such as, for example, a glass substrate. In many embodiments, the adhesive layer includes a ultra-violet light absorber compound or material.

The pressure sensitive adhesive (PSA) layer described above can any type of adhesive that enables the infrared light reflecting cholesteric liquid crystal layer to be affixed to another optical body such as, for example, glass. Ultra-violet absorption additives can be incorporated into the PSA. In many embodiments, the PSA is an optically clear PSA film such as a polyacrylate pressure sensitive adhesive. PSAs are normally tacky at assembly temperatures, which is typically room temperature or greater (i.e., about 20° C. to about 30° C. or greater). Materials that have been found to function well as PSAs are polymers designed and formulated to exhibit the requisite viscoelastic properties resulting in a desired balance of tack, peel adhesion, and shear holding power at the assembly temperature. The most commonly used polymers for preparing PSAs are natural rubber-, synthetic rubber- (e.g., styrene/butadiene copolymers (SBR) and styrene/isoprene/styrene (SIS) block copolymers), silicone elastomer-, poly alpha-olefin-, and various (meth) acrylate- (e.g., acrylate and methacrylate) based polymers. Of these, (meth)acrylate-based polymer PSAs have evolved as a preferred class of PSA for the present invention due to their optical clarity, permanence of properties over time (aging stability), and versatility of adhesion levels, to name just a few of their benefits.

A release liner can be disposed on the PSA. The release liner can be formed of any useful material such as, for example, polymers or paper and may include a release coat. Suitable materials for use in release coats include, but are not limited to, fluoropolymers, acrylics and silicones designed to facilitate the release of the release liner from the adhesive.

In some embodiments, the substrate can include a retarder film and the infrared light reflecting cholesteric liquid crystal layer can be disposed on one or both sides of the retarder film. The infrared light reflecting cholesteric liquid crystal layer can also be termed a cholesteric liquid crystal reflective polarizer. The pitch of the infrared light reflecting cholesteric liquid crystal layer is similar to the optical layer thickness of multilayer reflective polarizers. Pitch and optical layer thickness respectively determine the center wavelength of the infrared light reflecting cholesteric liquid crystal layer and multilayer reflective polarizers. The rotating director of the infrared light reflecting cholesteric liquid crystal layer forms optical repeat units similar to the multiple layers in multilayer reflective polarizers having the same optical layer thickness.

The center wavelength, $\lambda_0$, and the spectral bandwidth, $\Delta\lambda$, of the light reflected by the cholesteric liquid crystal layer depend on the pitch p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

When the birefringence of the material ($n_e - n_o$) is $\leq 0.2$, the spectral bandwidth or width (measured as full width at half peak height) of a cholesteric liquid crystal composition is generally 100 nm or less. This limits the usefulness of a cholesteric liquid crystal polymer when reflectivity over a wavelength range substantially larger than 100 nm is desired.

To make a cholesteric liquid crystal reflective polarizer capable of reflecting a broad range of wavelengths, multiple pitch lengths can be used. Broadband cholesteric liquid crystal polarizers can be formed by laminating or otherwise stacking two separately-formed cholesteric liquid crystal coatings, each disposed on an individual substrate, with different pitches (e.g., having different compositions, for example, different ratios by weight of chiral and nematic liquid crystal components). Each layer has a different pitch and, therefore, reflects light having a different wavelength.

With a sufficient number of layers, a polarizer can be constructed that reflects a large portion of the light spectrum. These constructions tend to have a non-uniform transmission or reflection spectra because each layer reflects a different region of light. The uniformity can be improved somewhat by allowing some diffusion of the liquid crystals between the various layers during construction. These layers can be heated to diffuse some liquid crystal material between the layers. This can result in an averaging of the pitches between the various layers.

This method, however, requires a substantial number of processing steps including separately forming each layer (e.g., individually drying or curing each layer), stacking (e.g., laminating) the layers, and then heating the layers to cause diffusion of liquid crystal material between the two layers. This also requires substantial processing time, particularly, in view of the time required for diffusion between the two previously formed liquid crystal layers which are typically polymeric in nature.

Techniques for making multi-layer cholesteric liquid crystal optical bodies have been developed. These techniques include solvent and material selection to facilitate forming two, three, or more cholesteric liquid crystal layers on a substrate from a single coating mixture.

In one illustrative embodiment, a method of forming cholesteric liquid crystal bodies includes forming two or more cholesteric liquid crystal layers from a single coating mixture, each of the cholesteric liquid crystal layers can have different optical properties. The coating mixture can include a first cholesteric liquid crystal composition, a second cholesteric liquid crystal composition, and a solvent. After coating a substrate with the coating mixture, a first layer and a second layer can be formed on the substrate from the single coating mixture. The single coating mixture includes one or more solvent(s) and two, or more cholesteric liquid crystal compositions that are at least partly soluble in the solvent(s). Useful compositions and methods describing cholesteric liquid crystal bi-layer constructions are described in U.S. 2004-0165140, which is incorporated by reference herein.

In another illustrative embodiment, a method of forming cholesteric liquid crystal bodies includes forming three or more cholesteric liquid crystal layers from a single coating mixture, each of the cholesteric liquid crystal layers can have different optical properties. The coating mixture can include a first cholesteric liquid crystal composition, a second cholesteric liquid crystal composition, and a solvent. After coating a substrate with the coating mixture, a first, second, and third layer can be formed on the substrate. The single coating mixture includes one or more solvent(s) and two, three, or more cholesteric liquid crystal compositions that are at least partly soluble in the solvent(s). Useful compositions and methods describing cholesteric liquid crystal bi-layer constructions are described in U.S. patent application Ser. No. 10/858,238, which is incorporated by reference herein.

These methods can form one, two, three or more cholesteric liquid crystal layers with different optical properties. Optical properties that can differ include, for example, pitch which can include effective pitch ($[n_e+n_o]/2 \times p$), and handedness.

In one embodiment, the mixture includes a first liquid crystal polymer, a second cholesteric liquid crystal monomer, and a second cholesteric liquid crystal polymer that is optionally formed from a portion of the second cholesteric liquid crystal monomer. The first cholesteric liquid crystal polymer and the second cholesteric liquid crystal polymer are different and have at least some level of incompatibility.

The second cholesteric liquid crystal polymer can be present in the mixture prior to coating the coating mixture onto the substrate. Alternatively or in addition, the second cholesteric liquid crystal polymer can be formed from the second cholesteric liquid crystal monomer after the coating mixture is coated onto the substrate. As solvent is removed from the coating mixture the first cholesteric liquid crystal polymer and the second cholesteric liquid crystal monomer at least partially separate into layers. In one embodiment, the first cholesteric liquid crystal polymer forms a layer adjacent the substrate and the second cholesteric liquid crystal monomer forms a layer on the first cholesteric liquid crystal polymer, generating a bi-layer structure on the substrate. The first layer, which can be adjacent to the substrate, includes a majority of the first cholesteric liquid crystal polymer. The second layer, which can be disposed on the first layer, includes a majority of the second cholesteric liquid crystal monomer. The cholesteric liquid crystal material in this structure can then be heated to form an aligned optical body. This aligned optical body can then be fully cured to form a fully cured optical body.

In some embodiments, a tri-layer construction can then be formed from the bi-layer structure by partial curing such that the physical properties of one or more of the second liquid crystal monomer, first liquid crystal polymer, and the second liquid crystal polymer are altered resulting in at least a portion of the second liquid crystal polymer migrating to a position between the second liquid crystal monomer layer and the first liquid crystal polymer layer. For example, by heating the bi-layer structure or at least partially curing the bi-layer structure with U.V. radiation, the solubility of the second liquid crystal monomer in the second liquid crystal polymer may be decreased causing the second liquid crystal monomer to at least partially separate from the second liquid crystal polymer to form a tri-layer structure. In this example, an optical body includes a first layer, a second layer, and a third layer disposed between the first and second layers. The first layer, which can be adjacent to the substrate, includes a majority of the first cholesteric liquid crystal polymer. The second layer includes a majority of the second cholesteric liquid crystal monomer. The third layer includes the second cholesteric liquid crystal polymer. This cholesteric liquid crystal material in this structure can then be heated to form an aligned optical body. This aligned optical body can then be fully cured to form a fully cured optical body.

The coating mixture can additionally include a reactive monomer material to crosslink, in addition to polymerize. This reactive monomer material may be a reactive monomer and, in some embodiments is a cholesteric liquid crystal compound, a precursor for a cholesteric liquid crystal polymer, or a chiral compound. For example, the reactive monomer material can be, for example, a di(meth)acrylate, an epoxy-acrylate, a diepoxide, a divinyl, a diallyl ether or other reactive material. This reactive monomer "sets" or "fixes" the cholesteric liquid crystal layer(s) and prevents or substantially reduces any movement of material within the layer(s) over time.

While not wishing to be bound by any particular theory, it is believed that a driving force for forming at least three layers having different optical properties from a single mixture involves the relative incompatibility of the two, three or more cholesteric compositions. This relative incompatibility may be represented or understood by the $\chi$ interaction parameter, interfacial tension, solubility parameter, or surface tension measurements. Any of these will be useful for characterizing liquid crystal materials that will phase separate. The formation of layers can depend on many factors including, but not limited to, viscosity, phase transition temperatures, solvent compatibility, molecular weight of the polymer, difference in surface tension, cholesteric liquid crystal phase morphology, and temperature of the components. For example, it is useful for one material to have a lower surface tension than another material to help drive it toward the top layer or surface. In addition, it can be useful to form a layer at a temperature high enough so that it is in the chiral nematic phase which typically has a lower viscosity. It is also useful for one material to have a relatively low viscosity at a processing temperature to reduce the time for phase separation to occur. It is also useful for the first cholesteric liquid crystal polymer layer (which may be the lower layer) to have sufficiently low viscosity to provide for enhanced mobility of the components. Consolidation and reduction of interfacial surface area are driving forces for the layer formation. The low viscosity of the polymer may be accomplished by selection of its composition, molecular weight, temperature, solvent balance, and plasticizer content.

Other processes can be used to enhance layer formation. For example, using two different solvents with different compatibilities for the cholesteric materials, as one solvent evaporates, one material can be released from the solution to form a layer while the other material(s) remains in solution. Alternatively or in addition, materials with very different nematic transition temperatures can be used so that one material is in its (relatively) low viscosity nematic phase while the other is a more viscous amorphous phase, thereby encouraging separation. Alternatively or in addition, one material could be at least partially cured to increase its viscosity or change its solubility and enhance separation.

Molecular weight differences can also be used. If two relatively incompatible cholesteric polymers are formed with different molecular weights, they will often have very different viscosities, which will enhance separation and layer formation.

Temperature can also be varied during the layer formation process. First, the temperature can be above the nematic transition temperature of one cholesteric compound but less than the nematic transition temperature of a second cholesteric compound. This will help the first material to form a cholesteric phase layer and enhance separation. The temperature can then be raised above the nematic transition temperature of the second cholesteric compound so that material will form its cholesteric phase layer. The cholesteric layers can then be fixed or set as described above.

The methods described above can be performed using a variety of techniques and equipment. The figures show a distinct physical boundary between layers for illustrative purposes only. As described herein, a "layer" will be understood to include a single physical thickness or a single optical thickness. A single physical thickness can include a distinct boundary layer as shown in the figures or can include a non-distinct boundary layer such as, for example, a compositional gradient between layers. A single optical thickness can be observed by an optical property such as, for example, reflection of light about a range of wavelengths. It is understood that zones between layers can include one or more or gradients of material or optical property gradients.

In some embodiments, a layer including nanoparticles can be disposed adjacent to the infrared light reflecting cholesteric liquid crystal layer. The nanoparticles can have any useful size such as, for example, 1 to 100, or 30 to 100, or 30 to 75 nanometers. The nanoparticle layer can have any useful thickness such as, for example, from 1 to 10 or 2 to 8 micrometers. The nanoparticle layer can include nanoparticles at any useful loading or wt % such as, for example, 30 to 90 wt %, 40 to 80 wt %, or 50 to 80 wt %.

In some embodiments, the nanoparticles include carbon nanoparticles. Useful carbon nanoparticle compositions are disclosed in U.S. Pat. No. 6,811,867, which is incorporated by reference herein.

In some embodiments, nanoparticles may be infrared light absorbers such as, for example metal oxide nanoparticles. A partial listing of these metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antinomy tin oxide, antimony doped tin oxide or mixtures thereof. In some embodiments, the metal oxide nanoparticles include tin oxide or doped tin oxide and optionally further includes antimony oxide and/or indium oxide. In some embodiments, the metal oxide nanoparticles include antimony tin oxide or doped antimony tin oxide dispersed in a polymeric material. The polymeric material can be any useful binder material such as, for example, polyolefin, polyacrylate, polyester, polycarbonate, fluoropolymer, and the like. In some embodiments, the metal oxide nanoparticles include indium tin oxide or doped indium tin oxide dispersed in a polymeric material. In many embodiments, the nanoparticle layer is nonconducting. Metal oxide nanoparticle compositions are commercially available from, for example, Advanced Nano Products Co., LTD., South Korea, under the tradenames TRB-PASTE™ SM6080(B), SH7080, SL6060. In another embodiment, the metal oxide nanoparticles include zinc oxide and/or aluminum oxide, such oxides are available from GfE Metalle und Materialien GmbH, Germany.

In some embodiments, a metal layer can be deposited on or disposed adjacent to the infrared light reflecting cholesteric liquid crystal layer. The metal layer can reflect a portion of the light spectrum, as desired. The metal layers can include, for example, gold, silver, aluminum, and/or nickel, as well as dispersions of these and other metals. The metal layer can be any useful thickness such as, for example, from 1 to 50 nanometers, or from 1 to 25 nanometers, or from 1 to 10 nanometers.

The infrared light reflecting articles can be disposed adjacent to or coupled with an optical substrate. Optical substrates can be formed of any useful material. In some embodiments, the substrate is formed of a polymeric material such as, for example, cellulose triacetate, polycarbonate, polyacrylate, polypropylene, or polyethylene terephthalate. In other embodiments, the substrate is formed of an inorganic material such as, for example, quartz, glass, sapphire, YAG, or mica. The substrate can have any useful thickness. In one embodiment, the substrate is automotive or architectural glass. In some embodiments including clear glass substrates as a glazing system, the glazing system has a shading coefficient of 0.68 or less, or 0.6 or less, or 0.55 or less, or 0.50 or less, at a visible transmission ($T_{vis}$) of 70% or greater.

In order to protect the infrared light reflecting articles, the exposed surface of the multilayer film can optionally be coated with a scratch and wear resistant hardcoat. The hardcoat layer can improve the durability of the infrared light reflecting articles during processing and during use of the end product. The hardcoat layer can include any useful material, such as silica-based hardcoats, siloxane hardcoats, melamine hardcoats, acrylic hardcoats, and the like. In some embodiments, the hardcoat layer includes infrared light absorbing metal oxide nanoparticles, describe above. The hardcoat can be any useful thickness such as, for example, from 1 to 20 micrometers.

Figure 1:
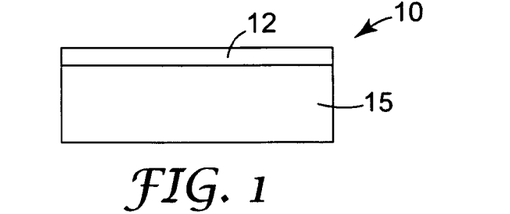
FIG. 1 to FIG. 5 schematically shows various illustrative embodiments of an infrared light reflecting article.

FIG. 1 schematically illustrates an embodiment of an infrared light reflecting article 10. The infrared light reflecting article 10 includes an infrared light reflecting cholesteric liquid crystal layer 12 disposed adjacent a visible light transparent substrate 15 (as described above). In some embodiments, the infrared light reflecting cholesteric liquid crystal layer 12 is coated or laminated onto the visible light transparent substrate 15. As described above, the cholesteric liquid crystal layer 12 can be tuned to reflect infrared light wavelengths of a first polarization (S- or P-polarization). In some embodiments, the cholesteric liquid crystal layer 12 can be tuned to reflect light from 850 nm to 900 nm, or from 1000 nm to 1050 nm, or from 1200 nm to 1250 nm, or from 1600 nm to 1650 mn.

In some embodiments, the visible light transparent substrate 15 is an infrared light reflecting multilayer film having alternating layers of a first polymer type and a second polymer type. In these embodiments, the visible light transparent substrate 15 can be tuned to reflect light (S- and P-polarization) in any portion of the IR light spectrum. In some embodiments, the visible light transparent substrate 15 can be tuned to reflect light from 800 run to 900 nm, or from 1000 nm to 1100 nm, or from 1200 nm to 1300 nm, or from 1600 nm to 1700 nm. In one embodiment, the visible light transparent substrate 15 can be tuned to reflect light (>80% reflection) from 800 nm to 1200 nm.

Figure 2:
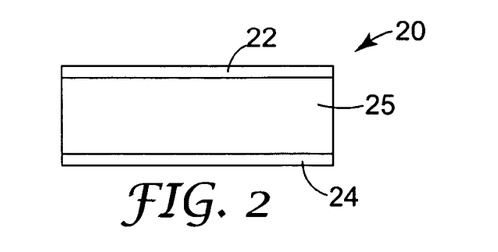

FIG. 2 schematically illustrates an embodiment of an infrared light reflecting article 20. The infrared light reflecting article 20 includes a visible light transparent substrate 25 disposed between a first infrared light reflecting cholesteric liquid crystal layer 22 and a second infrared light reflecting cholesteric liquid crystal layer 24 (as described above). In some embodiments, the infrared light reflecting cholesteric liquid crystal layers 22, 24 are coated or laminated onto the visible light transparent substrate 25. As described above, the cholesteric liquid crystal layers 22, 24 can be tuned to reflect infrared light wavelengths of a first polarization (S- or P-polarization). In some embodiments, the cholesteric liquid crystal layers 22, 24 can be tuned to reflect light from 850 nm to 900 nm, or from 1000 nm to 1050 nm, or from 1200 nm to 1250 nm, or from 1600 nm to 1650 nm.

As described above, cholesteric liquid crystal materials reflect circularly polarized light of wavelength and handedness matching the periodicity and symmetry of the cholesteric helical structure. Because a left hand cholesteric reflects left hand circularly polarized light, the right hand circular component passes through the cholesteric helical structure. Thus, around 50% of incident light of the tuned wavelength is reflected. Placing a right handed and a left handed cholesteric layers together can reflect up to 100% of incident light of the tuned wavelength. However, these compositions must be inert to one another if placed together or a non-birefringent layer must be placed between the cholesteric layers and finding both right and left handed cholesteric layers tuned to the proper wavelength can be difficult. One approach illustrated herein is to provide a retarder film 25 between the first infrared light reflecting cholesteric liquid crystal layer 22 and the second infrared light reflecting cholesteric liquid crystal layer 24, where both cholesteric layers are tuned to the same wavelength range and both cholesteric layers are the same handedness. Thus, the retarder film (e.g., half wave retarder) will rotate or invert the polarization-state of light transmitted through it. For example, right handed light that passes through a left handed cholesteric layer is converted in the retarder film to left handed light and that converted light can then be reflected by the second cholesteric layer and passed back out of the infrared light reflecting article 20.

In many embodiments, the visible light transparent substrate 15 is a retarder film tuned to an infrared light range of wavelengths that correspond to the range of wavelengths that the cholesteric layers are tuned to. In these embodiments, the visible light transparent substrate 15 can be tuned to retard light (S- and P-polarization) in any portion of the IR light spectrum.

In many embodiments, the infrared light reflecting article 20 can reflect 50% or greater, or from 60% to 99%, or from 70% to 95% of the incident light of the tuned wavelength.

In some embodiments, the visible light transparent substrate 15 is a retarder film tuned to an infrared light range of wavelengths and a UV light range and/or a visible light range that all correspond to the range of wavelengths that the cholesteric layers are tuned to. In these embodiments, the visible light transparent substrate 15 can be tuned to retard light (S- and P-polarization) in any portion of the IR light spectrum and UV or visible light spectrum. In many embodiments, the infrared light, and UV and/or visible light, reflecting article 20 can reflect 50% or greater, or from 60% to 99%, or from 70% to 95% of the incident light of the tuned wavelength ranges. In specific embodiments, these films can be reflect 50% to 100% or an infrared light wavelength range and can reflect 50% to 100% of a UV and/or visible light wavelength range. Thus, in some of these embodiments the reflecting article 20 can have a colored appearance, as desired. In one embodiment, the reflecting article 20 can reflect from 50% to 100% of an infrared light wavelength range and reflect from 50% to 100% of an visible light wavelength range, such as for example, a blue light wavelength range, and appear to have a blue color.

In some embodiments, the visible light transparent substrate 25 is a half wave PET retarder film. In one embodiment, the visible light transparent substrate 25 has a thickness from 5 to 25 micrometers.

Figure 3:
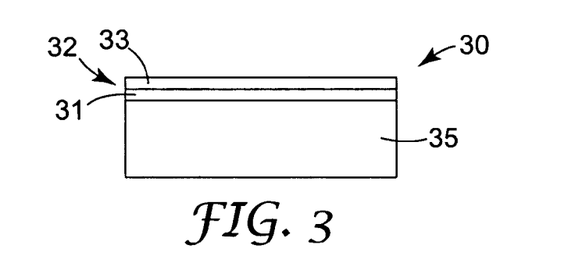

FIG. 3 schematically illustrates an embodiment of an infrared light reflecting article 30. The infrared light reflecting article 30 includes an infrared light reflecting cholesteric liquid crystal layer 32 disposed adjacent a visible light transparent substrate 35 (as described above). In some embodiments, the infrared light reflecting cholesteric liquid crystal layer 32 is coated or laminated onto the visible light transparent substrate 35. As described above, the cholesteric liquid crystal layer 32 can include a first layer 31 and a second layer 33 (a bi-layer structure). The first layer 31 can be tuned to reflect a first range of infrared light wavelengths of a polarization (S- or P-polarization) and the second layer 33 can be tuned to reflect a second range of infrared light wavelengths of a polarization (S- or P-polarization). In some embodiments, the first and second layer 31, 33 can be independently tuned to reflect light from 850 mn to 900 nm, or from 1000 nm to 1050 nm, or from 1200 nm to 1250 nm, or from 1600 nm to 1650 mn, or from 880 nm to 1060 nm, or from 1300 to 1640 nm. In one embodiment, the first layer 31 can be tuned to reflect light in a range from 880 nm to 1060 nm and the second layer 33 can be tuned to reflect light in a range from 1300 nm to 1640 nm. Useful compositions and methods describing cholesteric liquid crystal bi-layer constructions are described in U.S. 2004-0165140, which is incorporated by reference herein.

In another embodiment, the first layer 31 can be tuned to reflect infrared light having right or left handed rotation and the second layer 33 can be tuned to reflect infrared light having an opposite direction, thus substantially all infrared light of a specified wavelength can be reflected by the first layer 31 and the second layer 33.

In further embodiments, the cholesteric liquid crystal layer 32 can include a first, second and third layer (a tri-layer structure, not shown) where each layer is tuned to reflect a different range of infrared light. In many embodiments, the bi-layer structure can reflect a band of light wavelengths from 100 nm to 250 nm and the tri-layer structure can reflect a band of light wavelengths from 200 nm to 500 nm. Useful compositions and methods describing cholesteric liquid crystal bi-layer constructions are described in U.S. patent application Ser. No. 10/858,238, which is incorporated by reference herein.

In some embodiments, the visible light transparent substrate 35 is an infrared light reflecting multilayer film having alternating layers of a first polymer type and a second polymer type. In these embodiments, the visible light transparent substrate 35 can be tuned to reflect light (S- and P-polarization) in any portion of the IR light spectrum. In some embodiments, the visible light transparent substrate 35 can be tuned to reflect light from 800 nm to 900 nm, or from 1000 nm to 1100 nm, or from 1200 nm to 1300 nm, or from 1600 nm to 1700 nm. In one embodiment, the visible light transparent substrate 35 can be tuned to reflect light (>80% reflection) from 800 nm to 1200 run.

Figure 4:
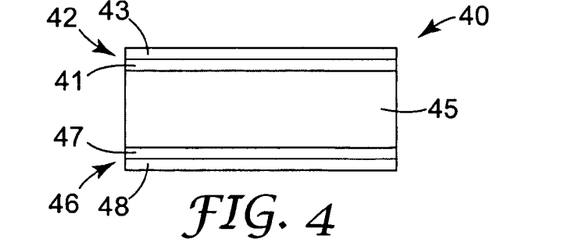

FIG. 4 schematically illustrates an embodiment of an infrared light reflecting article 40. The infrared light reflecting article 40 includes a visible light transparent substrate 45 disposed between a first infrared light reflecting cholesteric liquid crystal layer 42 and a second infrared light reflecting cholesteric liquid crystal layer 46 (as described above). In some embodiments, the infrared light reflecting cholesteric liquid crystal layers 42, 46 are coated or laminated onto the visible light transparent substrate 45. As described above, the first cholesteric liquid crystal layer 42 can include a first layer 41 and a second layer 43 (a bi-layer structure) and the second cholesteric liquid crystal layer 46 can include a first layer 47 and a second layer 48 (a bi-layer structure). The first layer 41, 47 can be tuned to reflect a first range of infrared light wavelengths of a polarization (S- or P-polarization) and the second layer 43, 48 can be tuned to reflect a second range of infrared light wavelengths of a polarization (S- or P-polarization). In some embodiments, the first layer 41, 47 and second layer 43, 48 can be independently tuned to reflect light from 850 nm to 900 nm, or from 1000 run to 1050 nm, or from 1200 nm to 1250 nm, or from 1600 nm to 1650 nm, or from 880 nm to 1060 nm, or from 1300 to 1640 nm. In one embodiment, the first layer 41, 47 can be tuned to reflect light in a range from 880 nm to 1060 nm and the second layer 43, 48 can be tuned to reflect light in a range from 1300 nm to 1640 nm.

In further embodiments, the first cholesteric liquid crystal layer 42 and the second cholesteric liquid crystal layer 46 can each include a first, second and third layer (a tri-layer structure, not shown) where each layer is tuned to reflect a different range of infrared light. In many embodiments, the bi-layer structure can reflect a band of light wavelengths from 100 n to 250 nm and the tri-layer structure can reflect a band of light wavelengths from 200 nm to 500 nm.

As described above, cholesteric liquid crystal materials reflect circularly polarized light of wavelength and handedness matching the periodicity and symmetry of the cholesteric helical structure. Because a left hand cholesteric reflects left hand circularly polarized light, the right hand circular component passes through the cholesteric helical structure. Thus, around 50% of incident light of the tuned wavelength is reflected. Placing a right handed and a left handed cholesteric layers together can reflect up to 100% of incident light of the tuned wavelength.

One approach illustrated herein is to provide a retarder film 45 between the first infrared light reflecting cholesteric liquid crystal layer 42 and the second infrared light reflecting cholesteric liquid crystal layer 46, where both cholesteric layers are tuned to the same wavelength range and both cholesteric layers are the same handedness. Thus, the retarder film (e.g., half wave retarder) will rotate or invert the polarization-state of light transmitted through it. For example, right handed light that passes through a left handed cholesteric layer is converted in the retarder film to left handed light and that converted light can then be reflected by the second cholesteric layer and passed back out of the infrared light reflecting article 40.

In some embodiments, the visible light transparent substrate 45 is a retarder film tuned to an infrared light range of wavelengths that correspond to the range of wavelengths that the cholesteric layers are tuned to. In these embodiments, the visible light transparent substrate 45 can be tuned to retard light (S- and P-polarization) in any portion of the IR light spectrum. In many embodiments, the infrared light reflecting article 40 can reflect 50% or greater, or from 60% to 99%, or from 70% to 95% of the incident light of the tuned wavelength.

In some embodiments, the visible light transparent substrate 45 is a half wave PET retarder film. In one embodiment, the visible light transparent substrate 45 has a thickness from 5 to 25 micrometers.

Figure 5:
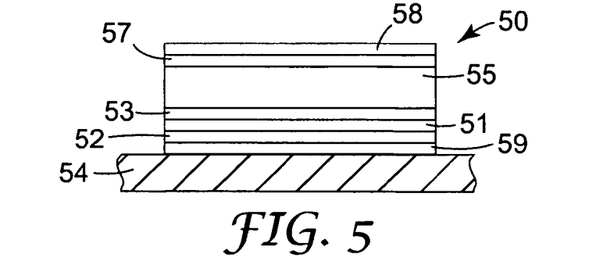

FIG. 5 is a schematically illustrates an embodiment of an infrared light reflecting article 50. The infrared light reflecting article 50 includes a retarder film layer 51 disposed between a first infrared light reflecting cholesteric liquid crystal layer 52 and a second infrared light reflecting cholesteric liquid crystal layer 53. Each cholesteric liquid crystal layer can be a single-, bi- or tri-layered cholesteric liquid crystal structure (as described above). As described above, the cholesteric liquid crystal layers can be tuned to reflect infrared light wavelengths of a first polarization (S- or P-polarization). In some embodiments, the cholesteric liquid crystal layers can be tuned to reflect light from 850 nm to 900 nm, or from 1000 nm to 1050 nm, or from 1200 nm to 1250 nm, or from 1600 nm to 1650 nm.

A visible light transparent substrate 55 is disposed on or adjacent to the second infrared light reflecting cholesteric liquid crystal layer 53. In some embodiments, the visible light transparent substrate 55 is an infrared light reflecting multilayer film having alternating layers of a first polymer type and a second polymer type. In these embodiments, the visible light transparent substrate 55 can be tuned to reflect light (S- and P-polarization) in any portion of the IR light spectrum. In some embodiments, the visible light transparent substrate 55 can be tuned to reflect light from 800 nm to 900 nm, or from 1000 nm to 1100 nm, or from 1200 nm to 1300 nm, or from 1600 nm to 1700 nm. In one embodiment, the visible light transparent substrate 55 can be tuned to reflect light (>80% reflection) from 800 nm to 1200 nm.

In the illustrated embodiment, a pressure sensitive layer 59 is disposed between an optical substrate 54 and the first cholesteric liquid crystal layer 52. In some embodiments, the pressure sensitive layer 59 is disposed on the first cholesteric liquid crystal layer 52. In many embodiments, the pressure sensitive layer 59 includes a U.V. absorber compound or material. A release layer or optical substrate 54 can be disposed on the pressure sensitive adhesive layer 59, prior to adhering to an optical substrate 54.

An infrared light absorbing nanoparticle layer 57 is shown disposed adjacent to or on the visible light transparent substrate 55. An optional hardcoat layer 58 is shown disposed adjacent to or on the nanoparticle layer 57. In some embodiments, the hardcoat layer includes the infrared light absorbing nanoparticles and thus, a separate infrared light absorbing nanoparticle layer 57 is not present. An additional IR reflecting metal layer can be included in the infrared light reflecting article, as desired. The nanoparticle layer 57, hardcoat layer 58 and metal layer, are all described above.

The above infrared light reflecting article constructions provide improved solar control film articles. In some embodiments, the infrared light reflecting article has an average visible light transmission (400 to 780 nm) of at least 45% and an average infrared light transmission for 780 nm to 2500 nm light of less than 10% or less than 15%. In some embodiments, the infrared light reflecting article has an average visible light transmission of at least 60% and an infrared light transmission of 20% or less for substantially all wavelengths between 950 nm and 2500 nm. In some embodiments, the infrared light reflecting article has an average light reflection between 780 and 1200 nm of 50% or greater and an average light transmission between 1400 and 2500 nm of 50% or less. In further embodiments, the infrared light reflecting article has an average light reflection between 780 and 1200 nm of 80% or greater and an average light transmission between 1400 and 2500 nm of 20% or less. In still further embodiments, the infrared light reflecting article has an average light reflection between 780 and 1200 nm of 90% or greater and an average light transmission between 1400 and 2500 nm of 5% or less.

EXAMPLES

All chemical disclosed below are commercially available from Aldrich Chemical Company, unless otherwise noted.

Example 1

Synthesis of RAFT Agent

A 250 mL round-bottom dry flask with a stir bar was charged with tetrahydrofuran (27.83 mL), carbon disulfide (5.02 mL), and 1-dodecanethiol (10 mL). The solution was cooled to 0 C. in an ice bath and triethyl amine (8.73 mL) was added dropwise. The solution turned yellow and was allowed to stir at 0° C. for 10 min and at room temperature for another 60 min (orange solution). The solution was cooled back to 0° C. in an ice bath and 2-bromopropanoic acid (3.8 mL) was added slowly. The orange solution turned yellow with white precipitate. The mixture was stirred at room temperature overnight and the white precipitate was filtered and washed with ethyl acetate. The filtrate was poured into a stirred aqueous HCI (1.0 N, 50 mL) solution. The orange organic layer was separated and washed with aqueous saturated sodium chloride (50 mL), dried over magnesium sulfate, filtered and concentrated under reduced pressure to yield a yellow solid. Hexane (90 mL) was added and the mixture was heated to form a homogeneous solution. The solution was recrystallized in a freezer to afford S-n-dodecyl-S'-(2-methylpropanoic acid)-trithiocarbonate as short yellow needles.

Liquid Crystal (LC) Polymer Synthesis and Coating Formation

4-Cyanobiphenyl benzoate ethyl acrylate (9.54 g, C2 monomer) and dioxolane (26.79g) were introduced into jar containing a magnetic stir bar. After the mixture was degassed for about 2 min with controlled nitrogen flow, the jar was sealed with tape, and placed into 130° C. oil bath, and stirred. After the monomer was fully dissolved, removed the jar from oil bath, let cool for a few minutes, and added the LC756 (0.36 g, Paliocolor, BASF), RAFT agent (0.34 g), and Vazo 67 (0.018 g, DuPont). The jar was resealed and put it back into oil bath. After the solution became clear again, the clear solution was placed into an oven at 65° C. for 24 hours. Then, Vazo 52 (0.018 g, DuPont ) was added and kept in the oven at 65° C. for another 24 hours to afford LC polymer having number-averaged molecular weight of 5500 g/mol. (polydispersity: 1.8, GPC results with polystyrene as internal standard).

Preparation of the C2 monomer is described in European Patent Application Publication No. 834754, which is incorporated herein by reference. The structure of 4-cyanobiphenyl benzoate ethyl acrylate is:

Compound LC 756 (Paliocolor™ LC 756 is commercially available from BASF) and Compound LC 242 (Paliocolor™ LC 242) are liquid crystal monomers available from BASF Corp. (Ludwigshafen, Germany). Vazo™ 52 and Vazo™ 67 (DuPont, Wilmington, Del.) are 10 thermally decomposable substituted azonitrile compounds used as a free radical initiators. This LC polymer solution (5.29 g) was combined with a LC 242 monomer solution (7.54 g, Paliocolor, BASF) prepared with the following formulation:

| LC monomer solution | |
|---|---|
| Chemicals | Weight (g) |
| LC756 | 0.34 |
| LC242 | 10.97 |
| BHT | 0.18 |
| Irgacure907 | 0.18 |
| Benzyl Al | 0.88 |
| 10% Byk361 | 3 drops |
| CHO | 8.80 |
| Dioxolane | 14.03 |
| HOCB | 2.50 |
| Total: | 37.88 |
| Solid content | 37.40% |

Where, BHT refers to 2,6-Di-tert-butyl-4-methyl phenol (96%, Aldrich), Irgacure 907 is a photoinitiator (Ciba), CHO is cyclohexanone (Aldrich), HOCB: 4-Cyano 4'-hydroxybiphenyl (TCI), 10%Byk361 is a commercial surfactant available from BYK Chemie, Wallingford, Conn., and Benzyl Al is benzyl alcohol.

After mixing this combined solution and filtering through a 0.45µm filter, it was coated on PET film (3M Scotchpak) using a wire-wound rod (number 10) to give a bi-layer liquid crystal coating of 6 micron dried thickness. The coating was air dried for about 15 second and then heated in a 120° C. oven for 5 minutes. Upon photocuring in a Fusion processor (Model: DRS-120, D-bulb, Fusion System Inc.) in air with a line speed of 20 FPM, a highly transparent, non-sticky LC coating was obtained with a low level of haze: 1.6%. Spectra measurement from 300 nm to 2500 nm on a Perkin Elmer spectrometer showed two distinctive reflecting bands covered from 830nm to 1280 nm spectra region, a desired reflecting region for solar control films.

Example 2

A liquid crystal (LC) polymer was prepared following similar procedures described in Example 1 using the following composition and condition:

| Chemicals | Actual Weight (g) |
|---|---|
| C2 monomer | 14.33 |
| LC756 | 0.54 |
| Dioxolane | 37.2 |
| Vazo 52 | 0.028 |
| $C_{12}H_{25}SH$ | 0.25 |
| Total: | 52.35 |
| Solid content | 28.93% |
| Conditions | 60° C./18 h |

This LC polymer solution (5.29 g) was combined with a LC 242 monomer solution (7.54 g, same solution described in Example 1). Following the same procedure used in Example 1, a highly clear bi-layer LC film was obtained with a low haze of 1.6%.

Example 3

A liquid crystal (LC) polymer was prepared following similar procedures described in Example 1 using the following composition and condition:

| Chemicals | Actual Weight (g) |
|---|---|
| C2 monomer | 4.78 |
| LC756 | 0.18 |
| Dioxolane | 13.38 |
| Vazo 52 | 0.01 |
| $C(CH_2OOCCH_2CH_2SH)_4$ | 0.16 |
| Total: | 18.51 |
| Solid content | 27.72% |
| Condition | 60° C./18 h |

This LC polymer solution (5.37 g) was combined with a LC 242 monomer solution (7.55g, same solution described in Example 1). Following the same procedure used in Example 1, a highly clear bi-layer LC film having a thickness of 5.0 μm was obtained with the following optical properties:

| Transparency: | 90.6 |
|---|---|
| Haze: | 0.53 |
| Clarity: | 98.8 |

Example 4

A liquid crystal LC polymer was prepared following the similar procedures described in Example 1 using the following composition and condition:

| Chemicals | Actual Weight (g) |
|---|---|
| C2 monomer | 4.77 |
| LC756 | 0.18 |
| Dioxolane | 13.38 |
| Vazo 52 | 0.01 |
| $CH_3(CH_2)_5SH$ | 0.04 |
| Total: | 18.38 |
| Solid content | 27.20% |
| Condition | 60° C./18 h |

This LC polymer solution (5.27 g) was combined with a LC 242 monomer solution (7.55g, same solution described in Example 1). Following the same procedure used in Example 1, a highly clear bi-layer LC film having a thickness of 4.90 μm was obtained with the following optical properties:

| Transparency: | 90.5 |
|---|---|
| Haze: | 1.19 |
| Clarity: | 98.7 |

Example 5

A LC polymer was prepared following similar procedures described in Example 1 using the following composition and condition:

| Chemicals | Actual Weight (g) |
|---|---|
| C2 monomer | 4.79 |
| LC756 | 0.18 |
| Dioxolane | 13.44 |
| Vazo 52 | 0.01 |
| $CH_3(CH_2)_7SH$ | 0.09 |
| Total: | 18.50 |
| Solid content | 27.37% |
| Condition | 60° C./18 h |

This LC polymer solution (5.29 g) was combined with a LC 242 monomer solution (7.54g, same solution described in Example 1). Following the same procedure used in Example 1, a highly clear bi-layer LC film having a thickness of 5.20 μm was obtained with the following optical properties:

| Transparency: | 90.4 |
|---|---|
| Haze: | 1.05 |
| Clarity: | 98.5 |

Example 6

A LC polymer was prepared following similar procedures described in Example 1 using the following composition and condition except that 1.0 g of THF was used to dissolve the mixture of LC756, Vazo 52 and 11-mercapto-1-undecanol:

| Chemicals | Actual Weight (g) |
|---|---|
| C2 monomer | 2.39 |
| LC756 | 0.10 |
| Dioxolane | 5.70 |
| Vazo 52 | 0.005 |
| $HO(CH_2)_{11}SH$ | 0.06 |
| THF | 1.00 |
| Total | 9.25 |
| Solid Content | 27.58% |
| Condition | 60° C./18 h |

This LC polymer solution (2.64 g) was combined with the LC monomer solution (3.77 g same LC monomer solution described in Example 1). Following the same procedure used in Example 1, a clear bi-layer LC film with a thickness of 5.20 micrometers was obtained with the following optical properties:

| Transparency: | 90.9 |
|---|---|
| Haze: | 1.07 |
| Clarity: | 99.7 |

Example 7

Single Layer LC Film

A LC polymer was prepared following the similar procedures described in Example 1 using the following composition and condition:

| Chemicals | Actual Weight (g) |
| --- | --- |
| C2 monomer | 4.77 |
| LC756 | 0.18 |
| Dioxolane | 13.38 |
| Vazo 52 | 0.01 |
| Total | 18.34 |
| Solid Content | 27.04% |
| Condition | 60° C./18 h |

This LC polymer solution (4.81 g) was combined with the additives HOCB (0.12 g) and CHO (1.39 g) as well as additional Dioxolane (3.90 g). Following the same procedure used in Example 1, a clear LC film (without thiol) having a thickness of 2.12 micrometers was obtained with the following optical properties:

| Transparency: | 89.1 |
| --- | --- |
| Haze: | 4.02 |
| Clarity: | 99.5 |

Example 8

Single Layer Film Made from Thiol-Involved C2 Polymer

LC polymer was prepared following the similar procedures described in Example 1 using the following composition and condition:

| Chemicals | Actual Weight (g) |
| --- | --- |
| C2 monomer | 4.76 |
| LC756 | 0.19 |
| Dioxolane | 13.41 |
| $C_{12}H_{25}SH$ | 0.08 |
| Vazo 52 | 0.01 |
| Total | 18.45 |
| Solid Content | 27.32% |
| Condition | 60° C./18 h |

This LC polymer solution (2.40 g) was combined with the additives HOCB (0.06g) and CHO (0.71 g) as well as additional Dioxolane (1.94 g). Following the same procedure used in Example 1, a highly clear LC film having a thickness of 2.31 micrometers was obtained with the following optical properties:

| Transparency: | 89.1 |
| --- | --- |
| Haze: | 3.30 |
| Clarity: | 99.3 |

Example 9

Control Example of Bilayered LC Film

LC polymer was prepared following the similar procedures described in Example 1 using the following composition and condition:

| Chemicals | Actual Weight (g) |
| --- | --- |
| C2 monomer | 4.77 |
| LC756 | 0.18 |
| Dioxolane | 13.38 |
| Vazo 52 | 0.01 |
| Total | 18.34 |
| Solid Content | 27.04% |
| Condition | 60° C./18 h |

The LC polymer solution (5.29 g) was combined with an LC 242 monomer solution (7.55 g, same solution described in Example 1). Following the same procedure used in Example 1, an bilayer LC film (without thiol) having a top layer thickness of 3.20 micrometers and a bottom layer thickness of 2.39 micrometers was obtained with the following optical properties:

| Transparency: | 89.9 |
| --- | --- |
| Haze: | 11.4 |
| Clarity: | 93.2 |

Example 10

Bilayered LC Film Made from Direct Mixing with Thiol ($n-C_{12}H_{25}SH$)

To the combined solution (6.00 g) described in Example 9 was added 1-dodecanethiol (0.02 g). The mixture was well mixed in an orbital shaker. Following the same procedure used in Example 1, a bilayer LC film having a having a top layer thickness of 3.12 micrometers and a bottom layer thickness of 2.35 micrometers was obtained with the following optical properties:

| Transparency: | 89.8 |
| --- | --- |
| Haze: | 16.1 |
| Clarity: | 86.1 |

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein.

Accordingly, the disclosure is to be limited only by the claims provided below.

The invention claimed is:

1. An infrared light reflecting article comprising:
a visible light transparent substrate comprising a polymer; and
an infrared light reflecting cholesteric liquid crystal layer disposed on the substrate, wherein the substrate and infrared light reflecting cholesteric liquid crystal layer have a combined haze value of less than 3%.

2. An article according to claim 1 further comprising a pressure sensitive adhesive layer disposed on the visible light transparent substrate or the infrared light reflecting cholesteric liquid crystal layer.

3. An article according to claim 1 wherein the visible light transparent substrate comprises an infrared light reflecting multilayer film having alternating layers of a first polymer type and a second polymer type.

4. An article according to claim 1 further comprising a second infrared light reflecting cholesteric liquid crystal layer disposed on the transparent substrate, wherein the transparent substrate is disposed between the infrared light reflecting cholesteric liquid crystal layer and the second infrared light reflecting cholesteric liquid crystal layer.

5. An article according to claim 4 wherein the visible light transparent substrate comprises a retarder film.

6. An article according to claim 1 wherein the infrared light reflecting cholesteric liquid crystal layer comprises a first layer reflecting a first range of infrared light and a second layer reflecting a second range of infrared light, wherein the first range is different from the second range.

7. An article according to claim 1 wherein the infrared light reflecting cholesteric liquid crystal layer comprises a first layer reflecting a first range of infrared light, a second layer reflecting a second range of infrared light, and a third layer reflecting a third range of infrared light, wherein the first range, second range and third range are different.

8. A light control article for blocking infrared light from an infrared light source comprising:
a visible light transparent substrate comprising a polymer;
an infrared light reflecting cholesteric liquid crystal layer disposed on the substrate, wherein the substrate and infrared light reflecting cholesteric liquid crystal layer have a combined haze value of less than 3%;
a pressure sensitive adhesive layer disposed on the visible light transparent substrate or the infrared light reflecting cholesteric liquid crystal layer, and
a glass substrate disposed on the pressure sensitive adhesive layer.

9. An article according to claim 8 wherein the visible light transparent substrate comprises an infrared light reflecting multilayer film having alternating layers of a first polymer type and a second polymer type.

10. An article according to claim 8 further comprising a second infrared light reflecting cholesteric liquid crystal layer disposed on the transparent substrate, wherein the transparent substrate is disposed between the infrared light reflecting cholesteric liquid crystal layer and the second infrared light reflecting cholesteric liquid crystal layer.

11. An article according to claim 10 wherein the visible light transparent substrate comprises a retarder film.

12. An article according to claim 8 wherein the infrared light reflecting cholesteric liquid crystal layer comprises a first layer reflecting a first range of infrared light and a second layer reflecting a second range of infrared light, wherein the first range is different from the second range.

13. An article according to claim 8 wherein the infrared light reflecting cholesteric liquid crystal layer comprises a first layer reflecting a first range of infrared light, a second layer reflecting a second range of infrared light, and a third layer reflecting a third range of infrared light, wherein the first range, second range and third range are different.

14. An infrared light reflecting article comprising:
a first cholesteric liquid crystal layer that reflects light in a first range of infrared wavelengths;
a second cholesteric liquid crystal layer that reflects light in the first range of infrared wavelengths; and
a retarder film disposed between the first cholesteric liquid crystal layer and the second cholesteric liquid crystal layer, wherein the retarder film retards at least a portion of the light in the first range of infrared wavelengths such that the light is reflected by the second cholesteric liquid crystal layer.

15. An article according to claim 14 wherein the retarder film has a half wave retardation at a wavelength in the first range of infrared wavelengths.

16. An article according to claim 14 wherein the first cholesteric liquid crystal layer reflects light in a first range of infrared wavelengths and in a second range of infrared wavelengths, wherein the first range is different from the second range;
a second cholesteric liquid crystal layer that reflects light in the first range of infrared wavelengths and in the second range of infrared wavelengths; and
a retarder film disposed between the first cholesteric liquid crystal layer and the second cholesteric liquid crystal layer, wherein the retarder film retards at least a portion of the light in the first range of infrared wavelengths and in the second range of infrared wavelengths such that the light is reflected by the second cholesteric liquid crystal layer.

17. An article according to claim 16 wherein the first range of infrared wavelengths comprises a range from 880 nanometers to 1060 nanometers and the second range of infrared wavelengths comprises a range from 1300 nanometers to 1640 nanometers.

18. An article according to claim 14 wherein the first range of infrared wavelengths comprises a range from 880 nanometers to 1060 nanometers or a range from 1300 nanometers to 1640 nanometers.

19. An article according to claim 14 further comprising an infrared light reflecting multilayer film having alternating layers of a first polymer type and a second polymer type and disposed adjacent the first cholesteric liquid crystal layer or the second cholesteric liquid crystal layer.

20. An article according to claim 19 wherein the infrared light reflecting multilayer film reflects light in a third range of infrared wavelengths and the third range is different from the first range.

21. An article according to claim 14 further comprising an infrared light absorbing layer disposed adjacent to the first cholesteric liquid crystal layer or the second cholesteric liquid crystal layer.

22. An article according to claim 14 wherein the first cholesteric liquid crystal layer reflects light in a second range of ultraviolet light or visible light wavelengths; the second cholesteric liquid crystal layer that reflects light in the second range of ultraviolet light or visible light wavelengths; and the retarder film retards at least a portion of the light in the second range of ultraviolet light or visible light wavelengths such that the light is reflected by the second cholesteric liquid crystal layer.

* * * * *

UNITED STATES PATENT AND TRADEMARK OFFICE
CERTIFICATE OF CORRECTION

PATENT NO. : 7,652,736 B2
APPLICATION NO. : 11/257965
DATED : January 26, 2010
INVENTOR(S) : Raghunath Padiyath It is certified that error appears in the above-identified patent and that said Letters Patent is hereby corrected as shown below:

Column 3

Line 24; Delete "gradients" and insert -- gradients. --, therefor.

Column 4

Line 33; Delete "a chiral" and insert -- achiral --, therefor.

Column 5

Line 18; Delete "hetroarylene;" and insert -- heteroarylene; --, therefor.

Line 23; Delete "hetrocyclylene," and insert -- heterocyclene, --, therefor.

Line 24; Delete "hetroarylene;" and insert -- heteroarylene; --, therefor.

Line 29; Delete " $R-R_1-R_2-(R_3R_4)_n-R_5-R_6$ " and insert

-- $R-R_1-R_2-(R_3R_4)_n-R_5-R_6$ --, therefor.

Line 33; Delete "hetroarylene;" and insert -- heteroarylene; --, therefor.

Line 36; Delete "hetroarylene;" and insert -- heteroarylene; --, therefor.

Column 7

Line 52; Delete "$CH_3(CH_2)_1$" and insert -- $CH_3(CH_2)_{11}$ --, therefor.

Column 9

Line 1; Delete "425nm" and insert -- 425 nm --, therefor.

Line 1; Delete "750nm)." and insert -- 750 nm). --, therefor.

Line 5; Delete "terphathalate" and insert -- terephthalate --, therefor.

Signed and Sealed this

Seventh Day of September, 2010

David J. Kappos
*Director of the United States Patent and Trademark Office*

Column 11

Line 1; Delete "terphthalate" and insert -- terephthalate --, therefor.

Column 12

Line 17; Delete "pitch" and insert -- pitch, --, therefor.

Column 13

Line 34; Delete "($[n_e+n_o]/2$ xp)," and insert -- ($[n_e+n_0]/2$xp), --, therefor.

Column 16

Line 29; Delete "($T_{vis}$)" and insert -- ($T_{VIS}$) --, therefor.

Line 55; Delete "mn." and insert -- nm. --, therefor.

Line 63; Delete "run" and insert -- nm --, therefor.

Column 17

Line 49-51; Delete "In many............... wavelength." and insert on Col. 17, Line 48 after "spectrum." as a continuation of the same paragraph.

Column 18

Line 25; Delete "mn" and insert -- nm --, therefor.

Line 27; Delete "mn," and insert -- nm, --, therefor.

Line 63; Delete "run." and insert -- nm. --, therefor.

Column 19

Line 16; Delete "run" and insert -- nm --, therefor.

Line 27; Delete "n" and insert -- nm --, therefor.

Column 21

Line 17; Delete "0 C." and insert -- 0° C. --, therefor.

Line 26; Delete "HCI" and insert -- HCl --, therefor.

Line 37; Delete "(26.79g)" and insert -- (26.79 g) --, therefor.

Line 47; Delete "DuPont )" and insert -- DuPont) --, therefor.

Column 22

Line 5; After "are" Delete "10".

Line 44; Delete "830nm" and insert -- 830 nm --, therefor.

Column 23

Line 25; Delete "(7.55g," and insert -- (7.55 g, --, therefor.

Line 57; Delete "(7.55g," and insert -- (7.55 g, --, therefor.

CERTIFICATE OF CORRECTION (continued)
U.S. Pat. No. 7,652,736 B2

<u>Column 24</u>

Line 22; Delete "(7.54g," and insert -- (7.54 g, --, therefor.

<u>Column 25</u>

Line 56; Delete "(0.06g)" and insert -- (0.06 g) --, therefor.

<u>Column 26</u>

Line 45; Delete "1 –dodecanethiol" and insert -- 1-dodecanethiol --, therefor.

<u>Column 27</u>

Line 45; In Claim 8, Delete "layer," and insert -- layer; --, therefor.